(12) United States Patent
Garcia Valenzuela et al.

(10) Patent No.: US 11,558,189 B2
(45) Date of Patent: Jan. 17, 2023

(54) HANDLING REQUESTS TO SERVICE RESOURCES WITHIN A SECURITY BOUNDARY USING A SECURITY GATEWAY INSTANCE

(71) Applicant: Microsoft Technology Licensing, LLC, Redmond, WA (US)

(72) Inventors: Fernando Garcia Valenzuela, Seattle, WA (US); Venkatasubrahmanyam Raman, Seattle, WA (US); Gerardo Diaz Cuellar, Kirkland, WA (US); Arupendra Narayan Roy, Seattle, WA (US); Bisconde Ramon Aquino, Snohomish, WA (US); Alexandru Naparu, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/107,842

(22) Filed: Nov. 30, 2020

(65) Prior Publication Data

US 2022/0173901 A1 Jun. 2, 2022

(51) Int. Cl.
*H04L 9/08* (2006.01)
*H04L 9/32* (2006.01)

(52) U.S. Cl.
CPC .......... *H04L 9/0872* (2013.01); *H04L 9/0825* (2013.01); *H04L 9/3213* (2013.01); *H04L 9/3263* (2013.01)

(58) Field of Classification Search
CPC ... H04L 9/0872; H04L 9/0825; H04L 9/3213; H04L 9/3263
See application file for complete search history.

(56) References Cited

U.S. PATENT DOCUMENTS 7,774,498 B1 8/2010 Kraemer et al.
8,010,085 B2 8/2011 Apte et al.
(Continued)

FOREIGN PATENT DOCUMENTS

IN 3360CH2013 A 8/2015

OTHER PUBLICATIONS

"Simply Connect Applications, Devices and Services—from Yesterday to the Internet of Things", In WhitePaper of Forgerock, Retrieved Date: Oct. 15, 2020, 4 Pages.
(Continued)

*Primary Examiner* — Techane Gergiso
(74) *Attorney, Agent, or Firm* — Jacob P. Rohwer; Newport IP, LLC

(57) ABSTRACT

The disclosure herein describes securing access to a service resource within a security boundary. A security gateway instance receives a request from an edge deployment outside the security boundary. The request includes identity data identifying the edge deployment. The identity data is validated based on allowed identity data of the security gateway instance and based on a validation handler associated with the service resource. Based on validating the identity data and validating the request, the identity data is transformed using security data specific to the security gateway instance. The transformed identity data indicates the request has been validated by the security gateway instance. Based on transforming the identity data of the request, the transformed identity data and the request are forwarded to the service resource via a network link within the security boundary, wherein the service resource is configured to process the request based on identifying the transformed identity data.

16 Claims, 7 Drawing Sheets

(56) References Cited

U.S. PATENT DOCUMENTS

| | | | |
|---|---|---|---|
| 8,205,240 | B2 | 6/2012 | Cowgill et al. |
| 8,296,178 | B2 | 10/2012 | Hudis et al. |
| 8,549,300 | B1 | 10/2013 | Kumar et al. |
| 9,218,616 | B2* | 12/2015 | Van Biljon ............ H04L 67/10 |
| 9,319,407 | B1 | 4/2016 | Mauer et al. |
| 10,003,600 | B2 | 6/2018 | Karunakaran et al. |
| 10,154,019 | B2 | 12/2018 | Mcroberts et al. |
| 11,133,933 | B1* | 9/2021 | Grund ................. G06F 16/2471 |
| 2004/0098485 | A1* | 5/2004 | Larson ............... H04L 63/1458 709/227 |
| 2009/0070583 | A1 | 3/2009 | Von et al. |
| 2010/0023756 | A1 | 1/2010 | Ben-itzhak et al. |
| 2011/0030039 | A1 | 2/2011 | Bilange |
| 2012/0209942 | A1 | 8/2012 | Zehavi et al. |
| 2015/0089623 | A1* | 3/2015 | Sondhi ............... H04L 63/0815 726/9 |
| 2015/0229638 | A1* | 8/2015 | Loo .................... H04L 63/0853 726/9 |
| 2017/0223026 | A1* | 8/2017 | Amiri .................... H04L 67/02 |
| 2019/0141119 | A1* | 5/2019 | Bernat ............... H04L 41/5006 |
| 2020/0021586 | A1* | 1/2020 | Schmidt ............. H04W 12/069 |
| 2020/0021609 | A1* | 1/2020 | Kuppanna .......... H04L 63/0227 |
| 2020/0084202 | A1* | 3/2020 | Smith .................. H04W 12/06 |
| 2020/0106763 | A1 | 4/2020 | Pancholi |
| 2020/0142735 | A1* | 5/2020 | Maciocco ............. H04L 9/0825 |
| 2020/0153623 | A1 | 5/2020 | Asanghanwa et al. |
| 2021/0021609 | A1* | 1/2021 | Smith ................. H04L 67/2842 |
| 2021/0042160 | A1* | 2/2021 | Alamouti ............... G06N 5/022 |
| 2021/0075870 | A1* | 3/2021 | Kempf .................. G06F 21/602 |
| 2021/0081271 | A1* | 3/2021 | Doshi ................... G06F 11/302 |
| 2021/0081404 | A1* | 3/2021 | Kempf ................... H04L 9/321 |
| 2021/0157848 | A1* | 5/2021 | Doshi .................. G06F 16/907 |

OTHER PUBLICATIONS

"Support of an on-premises HTTP Forward Proxy", Retrieved from: https://learn.akamai.com/en-us/webhelp/enterprise-threat-protector/enterprise-threat-protector/GUID-01371B63-7495-4D91-BA72-649DFFECB175.html, Retrieved Date: Oct. 15, 2020, 1 Page.

"Transparent Forward Proxy Configurations", Retrieved from: https://techdocs.f5.com/en-us/bigip-14-1-0/big-ip-access-policy-manager-secure-web-gateway-14-1-0/transparent-forward-proxy-configurations.html, Retrieved Date: Oct. 15, 2020, 14 Pages.

Goedtel, et al., "Connect Computers Without Internet Access by Using the Log Analytics Gateway in Azure Monitor", Retrieved from: https://docs.microsoft.com/en-us/azure/azure-monitor/platform/gateway, Dec. 24, 2019, 14 Pages.

Raj, Akhil, "API Gateway to the Rescue", Retrieved from: https://dzone.com/articles/gateway-pattern, Feb. 8, 2019, 5 pages.

"International Search Report and Written Opinion Issued in PCT Application No. PCT/US21/054883", dated May 3, 2022, 12 Pages.

\* cited by examiner

HANDLING REQUESTS TO SERVICE RESOURCES WITHIN A SECURITY BOUNDARY USING A SECURITY GATEWAY INSTANCE

BACKGROUND

In modern distributed and cloud computing systems, ensuring the safety of service resources within security boundaries while enabling infrastructure of the services to be deployed outside the boundaries and to enable access to the service resources by the infrastructure through secure processes presents substantial challenges. In some systems, the implementation of such processes requires separate sets of identities of entities for both sides of the security boundaries, and managing such sets of identities may require extensive changes and coordination across multiple components of the system, including edge deployments and associated agents that are outside the security boundaries.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for securing access to a service resource within a security boundary is described. A security gateway instance receives a request from an edge deployment outside the security boundary. The request includes identity data identifying the edge deployment and it targets the service resource within the security boundary. The identity data is validated. Based on the validation, the identity data is transformed into trusted identity data using security data specific to the security gateway instance. The transformed identity data indicates the request has been validated by the security gateway instance. Transforming the identity data includes at least one of the following: appending at least one data value associated with the security data to the identity data, translating at least one data value of the identity data based on a translation process of the security data, and mapping at least one data value of the identity data to a different data value based on the security data. Based on transforming the identity data of the request, the trusted identity data and the request are forwarded to the service resource via a network link within the security boundary, wherein the service resource is configured to process the request.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 7, the systems are illustrated as schematic drawings. The drawings may not be to scale.

DETAILED DESCRIPTION

Figure 1:
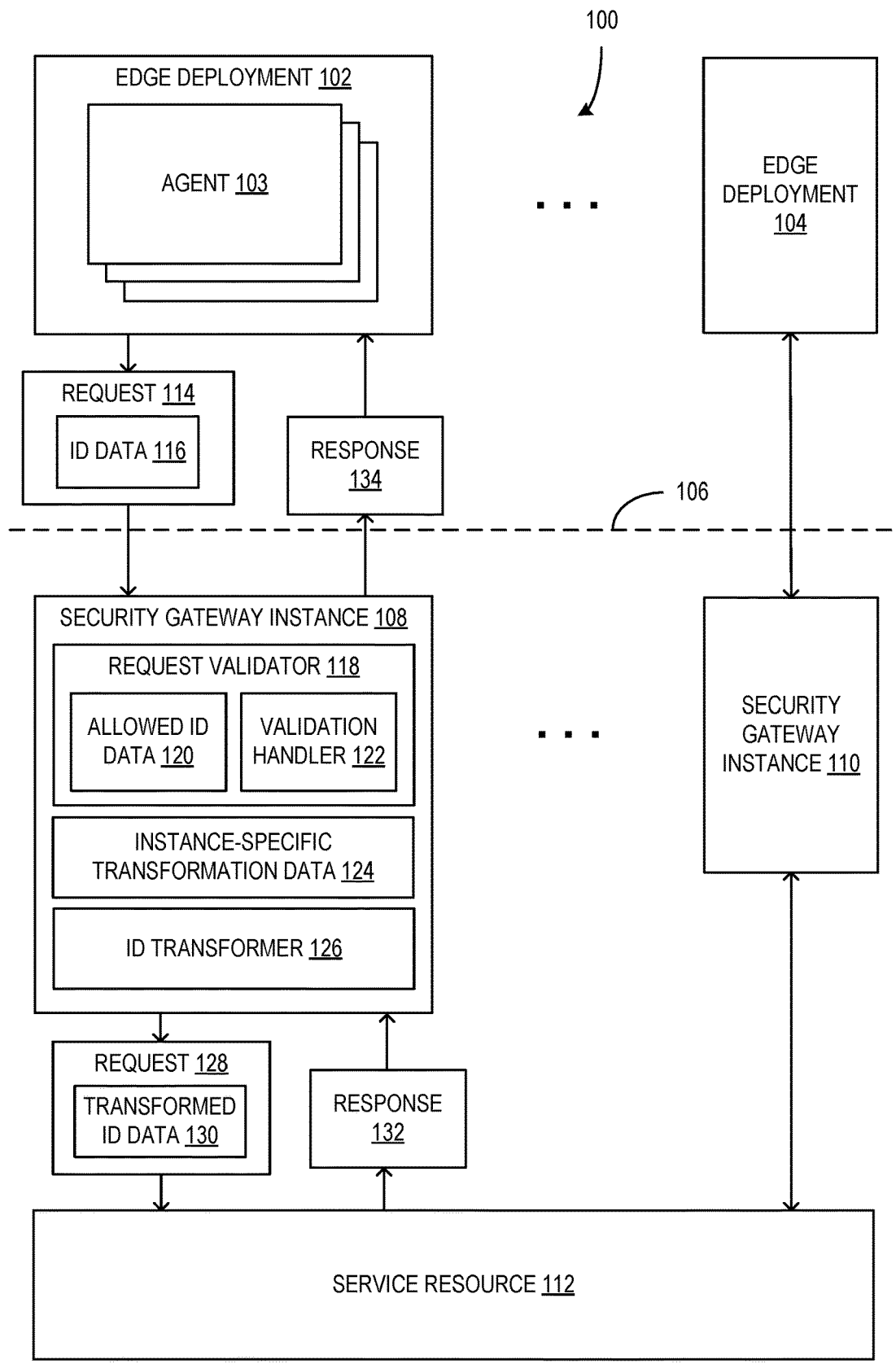
FIG. 1 is a block diagram illustrating a system configured for handling requests to network service resources within a security boundary from agents on edge deployments by security gateway instances according to an embodiment.

Aspects of the disclosure provide a computerized method and system for enforcing a security boundary and handling requests from edge deployments located outside the security boundary to service resources inside the security boundary, using a security gateway instance. The security gateway instance is configured to bridge the security boundary in such a way that requests from outside the security boundary are validated before being sent on to service resources, and edge deployments are enabled to continue using current identity data configurations associated with operating outside the security boundary yet still interact with the service resources through the security gateway instance. The security gateway instance is configured to only handle requests from a single associated or corresponding edge deployment and to process requests from the edge deployment in a unique way, such that use of the identity of the edge deployment with another gateway or other contact method to send requests to a service resource will automatically fail. Validation of requests by the security gateway instance may be based on the known identity of the edge deployment as well as other methods of validation defined in association with specific service resources. After validation, the service gateway instance is configured to transform identity data of the edge deployment using transformation data (or other instance-specific data or security data) specifically associated with the service gateway instance. The transformed identity data (or trusted identity data) is configured to be considered trustworthy by the service resource, such that the transformed identity data indicates to the service resource that the associated request has been validated by the appropriate service gateway instance. The service gateway instance may further handle responses from the service resource by forwarding them through the security boundary back to the sources of the requests. By bridging the security boundary in this way, the disclosure avoids requiring existing services outside the security boundary to make changes required to meet the requirements of interacting with service resources inside the security boundary.

The disclosure operates in an unconventional manner at least by adding a new layer of security for the service resources within the security boundary without requiring extensive changes or redesign of existing service resources and/or edge deployments. In some examples, the service gateway instance employs a "forward proxy" front end that is configured to operate outside a security boundary to receive requests, validate those requests, and direct the validated requests to a back end that is configured to operate within the security boundary. The security boundary between the front end and back end of the gateway service instance may be the same or different from the security boundary separating the service resource from the edge deployment. Trusted entities such as edge deployments described herein may be deployed outside the security boundary and securely interact with the service resources inside the security boundary through the described service gateway instance without compromising sensitive control plane information associated with the service resources (e.g., private networks of trusted clients may be deployed outside a central trusted environment and still access service resources within the trusted environment using the described service gateway instances). Deployment of many such trusted entities outside the security boundary necessitates the implementation of a centralized way to control security of interactions with the protected service resource and the described service gateway instances provide such centralized control.

Further, the service gateway instance of the disclosure validates incoming requests in a substantial, flexible manner at least in that it supports an extensible plug-in model that enables all services running within the security boundary to register validation handlers with the gateway service instance to validate incoming requests for their services. For instance, incoming hypertext transfer protocol secure (HTTPS) requests may be inspected by validation handler plugins at the gateway security instance such that the requests are only allowed to pass the security gateway if they are directed to expected and/or supported resources and if the headers, uniform resource identifiers (URIs), and content match expectations of the service resource after processing by the gateway security instance. In some examples, there are a plurality of gateway security instances, each one being associated with one edge deployment.

Additionally, the disclosure enforces an identity barrier. The set of identities that are available in edge deployments outside the security boundary cannot be used directly for service resources within the security boundary (the service resources being protected by the described security gateway instance). The security gateway instance is configured to validate requests and associated identity data and then, only after successful validation, translate or otherwise transform the identities of edge deployments outside the security boundary into identity information that is considered to be trusted by the service resources to which requests are directed. In some examples, the service resources perform additional validation, authentication, or other security processes against the identity information from the gateway security instance. This provides another layer of security protection to the service resources.

The transformation process at the security gateway instance provides an indication to the service resources that the specific security gateway instance has fully validated the request, such that minimal validation, if any, needs to be done at the service resource itself. The transformation may include the combination of identity data specific to the security gateway instance and the identity associated with the request, encrypting and/or decrypting identity data, wrapping identity data in service gateway instance-specific wrapper data, mapping identity data to trusted identity data using a service gateway instance-specific identity map, or the like.

The disclosure enables the implementation of service gateway instances as described herein in a flexible manner that reduces or eliminates the need to change how existing distributed or cloud services are configured, reducing "time-to-market" for the associated security improvements and enhancing the number of different systems on which the disclosure may be deployed. Further, the configuration of the service gateway instances reduces the "blast radius" of any edge deployment that may be compromised by viruses or other cyberattacks, such that the service resources (and gateway security instances not associated with the edge deployment) are protected and may continue functioning. This is ensured in part by the one-to-one mapping between security gateway instances and particular edge deployments. Any attack from an edge deployment will only affect the service gateway instance to which it is associated, and the attack will not bleed over and impact any other services or customers. If secret information and/or identities stored at the edge deployment level are leaked, that information does not impact other edge deployments or service resources because that information cannot be used with any other security gateway instance.

FIG. 1 is a block diagram illustrating a system 100 configured for handling requests (e.g., request 114) to network service resources (e.g., service resource 112) within a security boundary (e.g., security boundary 106) from agents (e.g., agents 103) on edge deployments (e.g., edge deployments 102-104) by security gateway instances (e.g., security gateway instances 108-110) according to an embodiment. In some examples, the system 100 includes an edge deployment 102 upon which a plurality of agents 103 are located and/or executed. The edge deployment 102 is located on one side of a security boundary 106 (e.g., outside of the security boundary 106) and an agent 103 on the edge deployment 102 sends a request 114 to the security gateway instance 108 on the other side of the security boundary 106 (e.g., inside of the security boundary 106) to request access to the service resource 112. The security gateway instance 108 is configured to handle the request 114 using various validation and/or transformation processes as described herein. In some examples, the system 100 includes a plurality of separate edge deployments 103-104 on one side and/or outside of the security boundary 106 and a plurality of security gateway instances 108-110 located on the other side and/or inside the security boundary 106. Each security gateway instance 110 may be associated one edge deployment of the plurality of edge deployments 103-104, such that all requests to access the service resource 112 and/or other communications over the security boundary 106 by agents of a particular edge deployment are configured to be sent to and handled by the security gateway instance with which the particular edge deployment is associated (e.g., the security gateway instance is "single-tenanted"). This one-to-one mapping or relationship between edge deployments and security gateway instances enhances security in that each security gateway instance may be configured to perform instance-specific operations on requests (e.g., request 114) as proof that the requests were handled by the associated security gateway instance. This proof may be checked at the service resource 112, such that requests that appear to be from an edge deployment but that are not proven to have been handled by the security gateway instance associated with the edge deployment may be ignored or otherwise rejected. The one-to-one mapping or relationship between an edge deployment and a security gateway instance may be formed by an administrator of the system and/or associated software entities, such as an instance generator entity that generates new security gateway instances within the security boundary 106 and maps, in one-to-one mappings or relationships, those security gateway instances to edge deployments that are configured to make requests of service resources within the security boundary 106. In some examples, such an instance generation process may include configuration of a new edge deployment outside the security boundary 106, performing an initial validation of the new edge deployment to confirm that the edge deployment can be trusted to use a service gateway instance, and then generation of a service gateway instance and mapping the new service gateway instance to the new edge deployment. Additional initial validation processes may be performed, such as updating service resources to trust validated requests from the new service gateway instance and the registering validation handlers specific to service resources on the new service gateway instance as described herein.

Example edge deployments 102-104 each include one or more computing devices that are configured to operate as edge nodes of a distributed "cloud" computing system that enables agents (e.g., agents 103) to access service resources within the cloud computing system. In some examples, edge deployments 102-104 include hardware, firmware, and/or software configured to store and/or execute agents 103 (e.g., applications or other software components) which may be used to provide access to the cloud computing system from outside the system (e.g., users that use browser applications or other applications to interact with the service resources of the cloud computing system, automated software entities configured to interact with the service resources of the cloud computing system). Further, the edge deployments 102-104 are configured to form network connections and/or communicate over network connections with the security gateway instances 108-110 and/or other entities within the cloud computing system (e.g., establishing a virtual private network (VPN) connection with an associated security gateway instance, sending requests to and receiving responses from a security gateway instance via the VPN connection).

In some examples, agents 103 are software entities, such as applications, that are configured to perform operations that are essential for, or aid in, the proper functioning of the edge deployment 102. The agents 103 perform a variety of operations including, but not limited to, collecting and uploading diagnostic information, monitoring resources, provisioning computational resources, reading and writing data, etc. In performing these operations, the agents 103 access and interact with the service resources 112, some or all of which are configured for managing the edge deployment 102. Other entities that are outside the cloud computing system (e.g., a user that accesses a web service running in the edge deployment 102) may implicitly trigger operations by an agent 103 and/or the service resource 112. Agents 103 may also be configured to perform other operations, such as data processing operations, user interface operations and/or interface operations with other computing entities, network communication operations, or the like that may make use of the service resources of the cloud computing system during their performance. In further examples, edge deployments and/or agents outside the security boundary 106 may include equipment and/or hardware, firmware, and/or software infrastructure that is owned or otherwise controlled by a customer entity or the like. The described systems and methods for implementing security gateway instances may enable flexible extension of secure access to service resources to deployments of a wide range of other entities without departing from the description. Further, the edge deployments and/or agents may be deployable to lower cost data centers outside of the security boundary without compromising the security measures of the service resources.

The security boundary 106 is a boundary (e.g., a trust boundary) within the system 100 that is enforced by the security gateway instances 108-110 as described herein. The security boundary 106 and the associated security gateway instances 108-110 may be configured to control the flow of data into the boundary 106 (e.g., from the edge deployment 102 on the first side, or "outside", of the security boundary 106 to the service resource 112 on the inside of the security boundary 106) and/or out of the boundary 106 (e.g., from the service resource 112 on the second side, or "inside", of the security boundary 106 to the edge deployment 102 on the outside of the security boundary 106). Requests, responses, and other data transmitted or otherwise sent across the security boundary 106 may be processed using a security protocol of the boundary 106 that may include verification and/or validation of the data crossing the boundary 106 and/or encryption or other transformation processes applied to the data crossing the boundary 106. Further, the security boundary 106 may include one or more security requirements for network connections that cross the security boundary 106 (e.g., network connections between the edge network 102 and the security gateway instance 108 may be required to use defined security measures, such as encryption).

Figure 3:
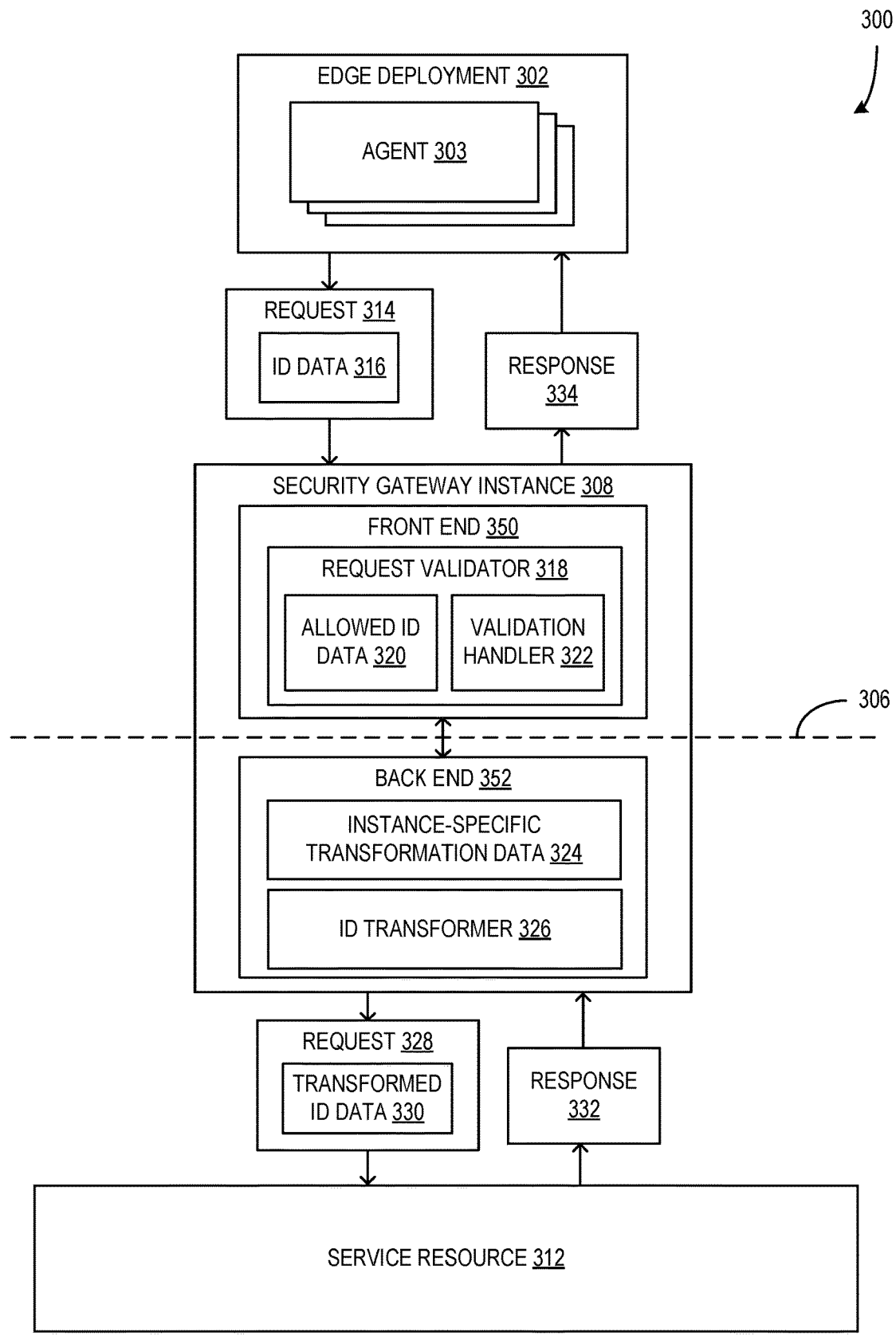
FIG. 3 is a block diagram illustrating a system for handling requests to network service resources within a security boundary using a security gateway instance with a front end and a back end in separate security contexts according to an embodiment.

The security gateway instance 108 includes hardware, firmware, and/or software configured to handle requests and/or other communications from edge deployments outside of the security boundary 106 directed to the service resource 112 and forwarding responses to requests from the service resource 112 to edge deployments as described herein. In some examples, the security gateway instance 108 is configured to receive the request 114, validate the request using a request validator 118, transform identification (ID) data 116 of the request using an ID transformer 126 and instance-specific transformation data 124 (e.g., security data), and send the request 128 with the transformed ID data 130 to the service resource 112 to be processed by the service resource 112. Further, a response 132 may be received from the service resource 112 by the security gateway instance 108, which may then forward the response 134 to the edge deployment 102 and/or an associated agent 103. Additionally, the security gateway instance 108 may perform processing on the response 132 prior to forwarding it to the edge deployment 102 and/or agent 103 as described herein. In some examples, the security gateway instance 108 may be divided into multiple sections such that each section is may be associated with different levels or contexts of security (e.g., a front end computing instance of the security gateway instance 108 that is configured to be on the outside of the security boundary 106 and a back end computing instance of the security gateway instance 108 that is configured to be on the inside of the security boundary 106, with a secured communication link between the two ends, as shown in FIG. 3). In some examples, the security gateway instance 108 may include software configured to operate as described that is stored, installed, and/or executed on a single hardware computing device of the system 100. Alternatively, software portions of the security gateway instance 108 may be spread across multiple hardware computing devices (e.g., a front end computing instance on one computing device and a back end computing instance on another computing device). In other examples, a single hardware computing device may host and/or execute multiple security gateway instances or portions of multiple security gateway instances, which may be kept separate using firmware and/or software boundaries, without departing from the description.

The request 114 from the edge deployment 102 and/or agent(s) 103 associated therewith is configured to identify the requesting entity via identity data or ID data 116 and to communicate a request to the service resource (e.g., a request to access some data of the service resource 112, a request for the service resource 112 to process some data or otherwise perform some operations, etc.). Because the service resource 112 is within the security boundary 106 and the edge deployment 102 is outside of the security boundary 106, the request 114 is first validated by the security gateway instance 108 prior to being provided to the service resource 112 for processing, as described herein. In some examples, the ID data 116 of the request 114 includes a unique or pseudo-unique identifier of the edge deployment 102 and/or of the agent 103 from which the request 114 originates. The ID data 116 is configured to identify the source of the request 114 within the security context outside of the security boundary 106. For example, the ID data 116 may be used by the edge deployment 102 and/or agents 103 thereof in communications to other entities, such as other edge deployments 104, that are also outside of the security boundary 106.

However, in some examples, for security reasons, the service resource 112 and/or other entities within the security boundary 106 are configured such that the ID data 116 of the edge deployment 102 and/or agents 103 is treated as invalid on the inside of the security boundary 106. For instance, this security measure may prevent other entities outside of the security boundary 106 from obtaining the ID data 116 of the edge deployment 102 and using the obtained ID data 116 to gain access to entities inside the security boundary 106 that are configured to trust the edge deployment 102 based on the ID data 116. The security gateway instance 108 is configured to validate the request 114, including the ID data 116 and to transform the ID data 116 into a valid identifier that is trusted by the service resource 112 based on a successful validation, as described herein, to increase security and prevent the use of ID data 116 used outside the security boundary 106 from being used by bad actors to access resources within the security boundary 106.

In some examples, to validate the request 114, the security gateway instance 108 uses a request validator 118. The request validator 118 includes hardware, firmware, and/or software configured to receive data associated with the request 114, including the ID data 116, validate the received data based on some defined validation rules, and thereby determine whether the request 114 is valid or invalid. If determined valid, the request 114 may be provided to the ID transformer 126, but if determined invalid, the request 114 may be rejected or otherwise ignored by the security gateway instance 108, such that it is prevented from reaching the service resource 112. The request validator 118 includes allowed ID data 120. The allowed ID data 120 may include one or more sets of ID data (e.g., ID data 116) associated with the edge deployment 102 and/or agents 103 thereof that are considered to be allowed by the security gateway instance 108. In examples where each security gateway instance 108 has a one-to-one relationship or mapping with an edge deployment 102, the allowed ID data 120 may include ID data that identifies the edge deployment 102 and/or ID data that identifies the agents 103 associated with the corresponding or mapped edge deployment 102. A validation rule of the request validator 118 associated with the allowed ID data 120 may indicate that only requests that include ID data that match at least one set of the allowed ID data 120 may be determined to be valid. Requests that do not contain such matching ID data are determined to be invalid and ignored. For instance, a validation rule may include instructions that cause the request validator 118 to compare the ID data 116 to each portion of data in the allowed ID data 120 and identify any matches to those data portions. A match based on these comparisons may trigger the validation of the ID data 116, while completing the comparisons without identifying a match may trigger an invalid determination of the ID data 116. Alternatively, or additionally, the security gateway instance 108 may be configured to send a rejection response upon determining a request is invalid.

In some examples, for requests that are determined to be valid based on the allowed ID data 120, additional validation processes are performed based on one or more validation handlers 122 that are also associated with the request validator 118. Validation handlers 122 include firmware and/or software code, instructions, applications, or the like and may be configured to be general or default handlers and/or handlers that are specific to a service resource 112 (e.g., if a request is directed to the service resource 112, validation handlers 122 associated with the service resource 112 specifically are used to validate the request, while other validation handlers may be used to validate requests directed at other resources). In some examples, the request validator 118 enables the configuration of validation handlers 122 as extensible plug-ins that enable all service resources within the security boundary 106 to register handlers 122 to validate incoming requests for those service resources (e.g., the request validator 118 may have separate validation handlers 122 from ten different service resources). The validation handlers 122 may be configured to define validation rules that cause the request validator 118 to validate requests 114 based on headers, uniform resource identifiers (URIs), content or body data of the requests, collected telemetry data of the requests, or the like. Such validation processes may match portions of a request with allowed or expected data, as with the allowed ID data 120. Alternatively, or additionally, the validation processes of the validation handlers 122 may identify allowed or expected patterns or otherwise evaluate the data of the request 114 against defined validation requirements. For instance, validation processes performed by the request validator 118 based on allowed ID data 120, validation handlers 122, and/or other validation rules may include validating that the edge deployment 102 is not determined to be in a compromised state and is allowed to communicate with at least a subset of the service resources within the security boundary 106, validating that the request comes from an expected identity scoped to the edge development 102 served by the security gateway instance 108 (e.g., AuthN-type authentication based on the ID data 116 and allowed ID data 120), validating that the presented identity is allowed to access the requested service resource based on a URI of the service resource and/or that the presented identity has access to the requested operations (e.g., AuthZ-type authentication), and/or validating the schema, format, and/or telemetry of the request, including the headers, URIs, and body to ensure that the schema, format, and/or telemetry are expected and valid.

The security gateway instance 108 is further configured to transform the ID data 116 of a request 114 using instance-specific transformation data 124 and an ID transformer 126 after the request 114 is determined to be valid using the request validator 118. Because the ID data 116 is configured to be used outside of the security boundary 106, it is not expected or trusted inside the security boundary 106 (e.g., by the service resource 112) in its current form. So, the security gateway instance 108 is configured to use the ID transformer 126 to transform the ID data 116 of the request 114, using the instance-specific transformation data 124, into a transformed ID data 130 that is trusted by the service resource 112 or other entity within the security boundary 106. Because the transformation is based on the instance-specific transformation data 124 (e.g., this data is specific or unique to the security gateway instance 108), the resulting transformed ID data 130 is configured to indicate that the request 128 with which the transformed ID data 130 is associated was validated by the security gateway instance 108 specifically. This enables the service resource 112 to evaluate a request 128 that is received to determine whether request 128 has been validated by a trusted security gateway instance 108. This may prevent another entity from attempting to fake the transformed ID data 130, as the transformed ID data 130 that is trusted by the service resource 112 may be impossible or improbable to reproduce without having the instance-specific transformation data 124.

In some examples, the ID data 116 includes an ID certificate and the ID transformer 126 is configured to transform the ID data 116 into a two-part composite ID certificate based on combining the ID certificate of the ID data 116 with the instance-specific transformation data, which includes ID data that uniquely or pseudo-uniquely identifies the security gateway instance 108. The security gateway instance 108 may be configured to forward the request 128 to the service resource 112 with the two-part composite ID certificate as the transformed ID data 130 and the service resource 112 may be configured to evaluate the two-part composite ID, identify the ID data of the security gateway instance 108 within the composite ID, and thereby validate that the identified ID data is from a trusted security gateway instance. Additionally, other evaluations may be applied to the portion of the two-part composite ID that includes the ID data 116 based on the configuration of the service resource 112. When that evaluation is complete, the service resource 112 may be configured to process the request 128, which may include responding to the request with a response 132 and/or performing one or more data processing operations (e.g., the request may request a set of data from the service resource 112 and the service resource 112 may find the requested data and generate a response 132 that includes the requested data, which it then sends to the security gateway instance 108 to be forwarded on).

In other examples, other types of ID data may be used. For instance, the ID data 116 may be configured to include an encrypted token that is configured to only be decrypted at the security gateway instance 108. In such examples, the decrypted token may be used as transformed ID data 130 to indicate that the associated request has been validated by the security gateway instance 108 as described herein. Such examples are described in greater detail with respect to FIG. 2. Other types of ID data 116 and/or types of transformations thereof may be used without departing from the description herein (e.g., mapping ID data 116 to trusted transformed ID data 130 based on a defined map specific to the instance 108 as the transformation data 124, other symmetric/public key arrangements, other methods of "wrapping" tokens for use by the entities outside of the security boundary 106, etc.).

The service resource 112 includes hardware, firmware, and/or software configured to receive requests (e.g., request 128), perform operations based on requests, and/or provide responses (e.g., response 132) to requests as described herein. In some examples, the service resource 112 is configured to validate or otherwise check the transformed ID data 130 prior to performing any operations based on the request 128, such that, if the transformed ID data 130 is validated (e.g., the data 130 is in an expected form and/or includes expected data values associated with the security gateway instance 108), operations associated with the request 128 are performed and, if the transformed ID data 130 is not validated, operations associated with the request 128 are not performed and the request 128 may be rejected or otherwise ignored. The service resource 112 may include a service associated with a data store that is configured to retrieve data from the data store based on the request 128 and provide the retrieved data to the requestor via a response 132. Additionally, or alternatively, the service resource 112 may include a service configured to perform data processing operations on data based on the request 128 and provide confirmation of the performance of the operations and/or results of the operations to the requestor via the response 132. The data upon which the operations are performed may be data provided in the request 128 and/or data stored in data store with which the service resource 112 is associated. For instance, the service resource 112 may include a service that maintains user profile data in a data store within the security boundary 106. Upon receiving a request 128 that requests a user profile be updated with included data values, the service resource 112 may validate the transformed ID data 130 of the request 128 and then perform profile update operations on stored user profile data to include the included data values of the request in the stored user profile data. Upon completion of the operations, the response 132, including a confirmation that the update has been completed, may be sent to the requestor via the security gateway instance 108.

The response 132 and 134 include data associated with the service resource 112 and based on the request 128. The service resource 112 may generate a response 132 in response to the request 128 that confirms the reception of and/or processing of the request 128 to the requestor (e.g., an agent 103 of the edge deployment 102). Alternatively, or additionally, if the request 128 is rejected or ignored due to failed validation, the service resource 112 may generate a response 132 that includes notification of the validation failure. Further, the response 132 may be generated to include data that is in response to the content of the request 128. For instance, if the request 128 includes a request for a particular portion of data associated with the service resource 112, the response 132 may be generated to include the requested portion of data. Alternatively, or additionally, if the request 128 includes a request for one or more operations to be performed by the service resource 112, the response 132 may be generated to include a confirmation of performance of the requested operation(s) and/or resulting data values of performance of the requested operation(s).

Further, the response 132 may be generated to include the transformed ID data 130 and/or other identifying information associated with the request 128, which may be used by the security gateway instance 108 to forward the response 134 to the entity that originally sent the request 114. In some examples, the response 132 generated by the service resource 112 and provided to the security gateway instance 108 is processed by the security gateway instance 108 to maintain the security measures of the security boundary 106 as described herein. For instance, the service resource 112 may include the transformed ID data 130 in the response 132 and the security gateway instance 108 may be configured to transform the transformed ID data 130 back into the ID data 116, removing or otherwise protecting and/or obscuring the instance-specific transformation data 124 from agents 103 of the edge deployment 102. As a result, the response 134 that is forwarded to the edge deployment 102 by the security gateway instance 108 may include the ID data 116, but transformation data 124 and data indicative of aspects of the transformation process that generated the transformed ID data 130 are not included in the response 134. Thus, such data that is required to generate the transformed ID data 130, which was considered valid and/or trusted within the security boundary 106, is preserved behind the security boundary 106, preventing it from being misused by agents 103 of the edge deployment 102 or from being intercepted by other entities outside the security boundary 106. The response 134 excludes, omits, or is otherwise sent through the gateway security instance 108 to the agent 103 without any trace of the transformation data 124 or similar data. Additionally, it should be understood that the responses 132 and 134 may include an identifier of the specific request to which they are responses (e.g., an identifier of the request 114 in addition to ID data 116 that identifies the source of the request).

Figure 2:
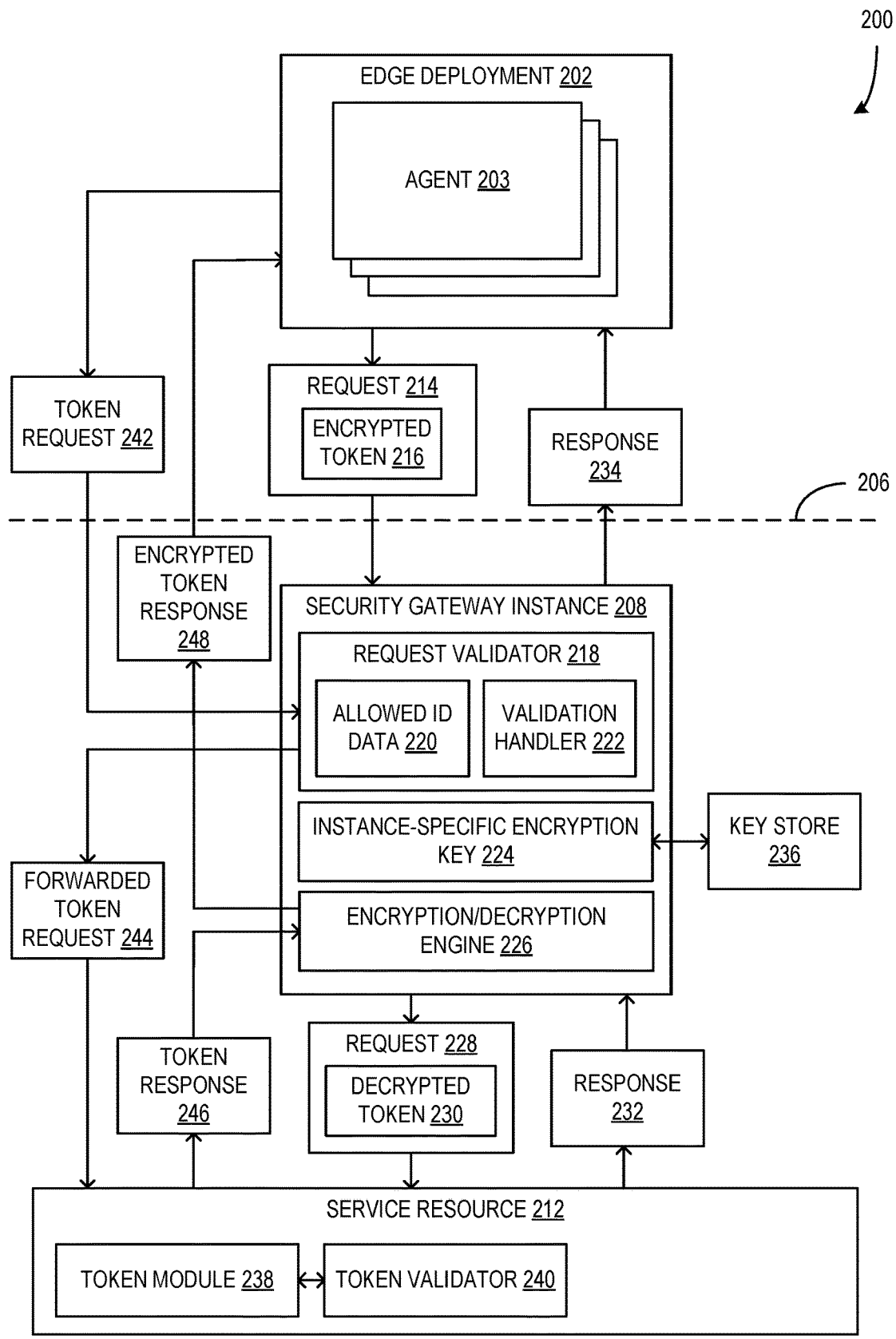
FIG. 2 is a block diagram illustrating system configured for handling requests to network service resources within a security boundary using encrypted tokens managed by a security gateway instance according to an embodiment.

FIG. 2 is a block diagram illustrating system 200 configured for handling requests (e.g., request 214) to network service resources (e.g., service resource 212) within a security boundary 206 using encrypted tokens (e.g., encrypted token 216) managed by a security gateway instance 208 according to an embodiment. In some examples, the system 200 is configured to operate in substantially the same manner as system 100 of FIG. 1 described above. For instance, an agent 203 of the edge deployment 202 may be configured to send the request 214 to the service resource 212 via the security gateway instance 208. The security gateway instance 208 is configured to validate the request 214 based on ID data of the request 214 that include an encrypted token 216 using the request validator 218 and the associated allowed ID data 220 and the validation handler 222. The security gateway instance 208 is further configured to transform the request 214 into the request 228 using the encryption/decryption engine 226 and an associated instance-specific encryption key 224 and/or other secret information. The transformation of the request 214 includes decrypting the encrypted token 216 into a decrypted token 230 based on the instance-specific encryption key 224. The request 228 is provided to the service resource 212, which checks the decrypted token 230 using the token validator 240 and, based on the token 230 being validated, the service resource 212 generates and sends a response 232 back to the security gateway instance 208, which then forwards the response 234 back to the edge deployment 202.

In some examples, in order for an agent 203 and/or the edge deployment 202 to obtain an encrypted token 216 that can be used for accessing the service resource 212, a token request 242 is sent to the service resource 212 via the security gateway instance 208. The token request 242 may be configured to include ID data that identifies the source of the request (e.g., the edge deployment 202 and/or the agent 203) as well as data indicating that a token is requested. Upon receiving a token request 242, the security gateway instance 208 is configured to validate the token request 242 using the request validator 218. The validation may include validating the ID data included in the token request based on the allowed ID data 220. Other validation operations may also be performed based on validation handler(s) 222 of the service resource 212 and/or based on other validation rules specific to token requests. If the validation at the request validator 218 is successful, the security gateway instance 208 forwards the request as a forwarded token request 244 to the service resource 212.

Upon receiving the forwarded token request 244, the service resource 212 may be configured to generate a token response 246 that includes a token generated or otherwise stored by the token module 238 of the service resource 212. The provided token from the token module 238 is configured such that the service resource 212 can recognize it when it is received as part of a request (e.g., request 228) and thereby trust the associated request. The token module 238 may include a set of tokens that may be issued in token responses 246 and/or the module 238 may be configured to generate tokens to be issued using a unique or pseudo-unique token generation method. It should be understood that, upon receiving a request 228 with a decrypted token 230, the token validator 240 of the service resource 212 may be configured to interact with the token module 238 to determine whether the decrypted token 230 is valid (e.g., the token validator 240 may attempt to match the decrypted token 230 to a list or set of trusted tokens stored by the token module 238 and/or analyze the decrypted token 230 based on a token generation process of the token module 238). Further, the token module 238 may be configured to reject requests for tokens that come from entities other than the security gateway instance 208 that is trusted (e.g., a token request to the token module 238 may include trusted data included by the security gateway instance 208 that the token module 238 checks for, such that token requests from other entities, such as direct requests from a compromised edge deployment, are automatically rejected due to lacking the trusted data from the instance 208).

The service resource 212 is configured to send the token response 246 with the issued token to the security gateway instance 208, and the instance 208 is configured to encrypt the issued token (e.g., decrypted token 230) using the encryption/decryption engine 226 and the instance-specific encryption key 224. The instance-specific encryption key 224 may be obtained from a key store 236 and, in some examples, the key store 236 is configured to only be accessible by the security gateway instance 208 or even by specific components within the security gateway instance 208, such as the encryption/decryption engine 226. After the issued token is encrypted into an encrypted token (e.g., encrypted token 216), the security gateway instance 208 is configured to forward the token response as an encrypted token response 248 to the edge deployment 202 from which the original token request 242 originated. The encrypted token response 248 provides the encrypted token to the edge deployment 202 and/or an associated agent 203 such that request 214 may be directed to the service resource 212 with the received encrypted token 216 as proof of the identity of the requesting entity. It should be understood that, as configured, the tokens that the service resource 212 is configured to trust (e.g., the decrypted token 230) are never sent across the security boundary 206 in a decrypted form and the key used to decrypt the tokens (e.g., the instance-specific encryption key 224) is also protected within the security boundary 206, in some examples. As a result, the encrypted token 216 held by the edge deployment 202 and/or agent 203 thereof can only be used to access the service resource 212 after it has been validated and transformed by the specific security gateway instance 208. Any request from an entity that includes an encrypted token that is directed to the service resource 212 directly or that is sent via a different security gateway instance may be automatically failed due to the failure to decrypt the encrypted token 216.

FIG. 3 is a block diagram illustrating a system 300 for handling requests (e.g., request 314) to network service resources (e.g., service resource 312) within a security boundary 306 using a security gateway instance 308 with a front end 350 (e.g., a front end computing instance, such as a virtual machine or container) and a back end 352 (e.g., a back end computing instance, such as a virtual machine or container) in separate security contexts according to an embodiment. In some examples, the system 300 is configured to operate in substantially the same manner as the system 100 of FIG. 1 described above. For instance, the edge deployment 302 and/or agent 303 thereof send a request 314 including ID data 316 for access to the service resource 312. The request 314 is sent to the security gateway instance 308, which is configured to validate the request 314 using the request validator 318 and associated allowed ID data 320 and/or validation handlers 322. The security gateway instance 308 is further configured to transform the ID data 316 and/or other aspects of the request 314 using an ID transformer 326 and instance-specific transformation data 324 as described herein. The request 328, including the transformed ID data 330, is provided to the service resource 312, which may be configured to verify or validate the transformed ID data 330. Additionally, the service resource 312 may respond to the request 328 by sending a response 332 to the security gateway instance 308, which is configured to forward the request 334 to the edge deployment 302 and/or associated agent 303.

As illustrated, the security gateway instance 308 has a front end 350 that in a separate security context (e.g., outside the security boundary 306) than the back end 352 (e.g., inside the security boundary 306). In some examples, front end 350 and back end 352 are stored on and/or executed on separate hardware computing devices, separate virtual machines (VMs), separate containers, other types of computing instances, or the like. The front end 350 includes the request validator 318 and associated allowed ID data 320 and validation handlers 322, while the back end 352 includes the ID transformer 326 and instance-specific transformation data 324.

Because the front end 350 is positioned outside the security boundary 306, the communications between the edge deployment 302 and the front end 350 of the security gateway instance 308 may be configured as communications between two entities of the same security context (e.g., the edge deployment 302 does not need to be updated to configure it to communicate according to a different security protocol). Instead, the security requirements of the security boundary 306 may be enforced on communications between the front end 350 and back end 352 of the security gateway instance 308 itself. In this way, the front end 350 is configured to behave as a "forward proxy", such that edge deployments and other entities outside the security boundary 306 may remain largely unchanged and direct requests to resources inside the security boundary 306 to a front end 350 of a security gateway instance 308, relying on the security gateway instance 308 to handle all security requirements.

As part of enforcing the security boundary 306, the front end 350 includes the request validator 318, allowed ID data 320, and the validation handler 322 of the service resource 312 so that validation of the request 314 may be performed prior to sending it across the boundary 306 into the back end 352. Further, the instance-specific transformation data 324 and ID transformer 326 are protected within the security boundary 306, such that no entity outside the security boundary 306 (except for the front end 350) can access these sensitive portions of the security gateway instance 308. For instance, if the instance-specific transformation data 324 includes a key which is used to encrypt and/or decrypt tokens as described above in FIG. 2, the key remains protected within the security boundary 306 as part of the security context of the back end 352.

It should be understood that interactions between the front end 350 and back end 352 may be secured using encrypted network communications, VPN connections, virtual networks, firewall rules, or other types of secure network communications without departing from the description. Further, in other examples, the front end 350 and back end 352 may be positioned in separate security contexts without the front end 350 being outside the security boundary 306. In such examples, the front end 350 may be positioned within the security boundary 306 but still remain outside the security context of the back end 352 and/or the service resource 312. Such arrangements provide additional separation between the operations of the front end 350 and the back end 352, resulting in stronger protection of sensitive data that enables the back end 352 to generate trusted tokens and/or other identity data which provide the only way to access the service resource 312. Other arrangements of security contexts among the entities of the security gateway instance 308 may be used without departing from the description.

Figure 4:
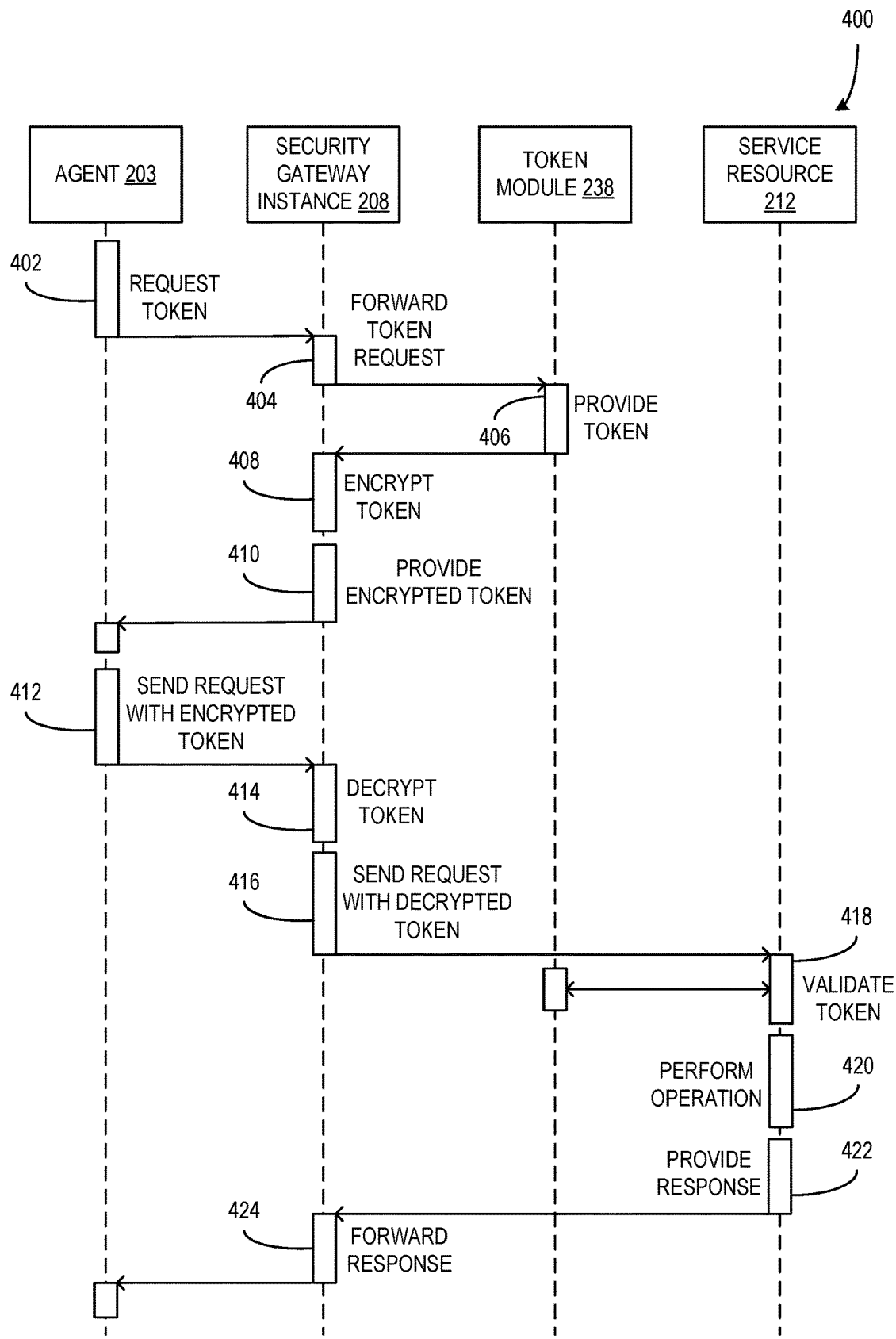
FIG. 4 is a diagram illustrating a computerized method for distributing encrypted tokens to agents of edge deployments and enabling the encrypted tokens to be used to access service resources according to an embodiment.

FIG. 4 is a diagram illustrating a computerized method 400 for distributing encrypted tokens (e.g., encrypted token 216) to agents (e.g., agents 203) of edge deployments (e.g., edge deployment 102) and enabling the encrypted tokens to be used to access service resources (e.g., service resource 212) according to an embodiment. In some examples, the method 400 is executed or otherwise performed on or by one or more components (e.g., the security gateway instance 208) of a system such as the system 200 of FIG. 2. At 402, the agent 203 requests a token by sending a token request to the security gateway instance 208 and, at 404, the security gateway instance 208 forwards the token request to a token module 238 or token issuer, which may be part of or otherwise associated with the service resource 212. In some examples, the security gateway instance 208 validates the token request (e.g., based on rules associated with allowed identity data and/or validation handlers as described herein) prior to forwarding the token request to the token module 238.

At 406, the token module provides the requested token to the security gateway instance 208 in response to the token request. In some examples, the token module 238 may verify that the token request has been validated or otherwise processed by the security gateway instance 208 (e.g., the security gateway instance 208 may transform the token request to indicate that it is validated or the security gateway instance 208 may otherwise indicate that the request is validated in communications with the token module 238).

At 408, the security gateway instance 208 encrypts the token. In some examples, the security gateway instance 208 uses a key or other encryption data that is unique or otherwise specific to the security gateway instance 208 to encrypt the token, such that only the security gateway instance 208 is capable of decrypting the encrypted token. The security gateway instance 208 may store the key or other encryption information in a key store that only the security gateway instance 208 is able to access and that is stored within the security boundary with the security gateway instance 208 and the service resource 212.

At 410, the security gateway instance 208 provides the encrypted token to the agent 203 in response to the agent's request for a token. Later, after the agent 203 has a token from the token module 238, the agent may send a request with the encrypted token at 412. The encrypted token may be included in the request as identity data associated with the agent 203. In other examples, the encrypted token may be used as identity data for the edge deployment with which the agent 203 is associated, such that requests from all agents of that edge deployment may use the encrypted token as described herein. The request may further include request data that indicates the agent 203 is requesting that the service resource 212 provide data and/or perform one or more operations on data. For instance, if the service resource is configured to provide requested sets of data from a database within the security boundary, the request may include request data that identifies the set of data the agent 203 is requesting and any other data that may be associated with retrieving the data from the database. In other examples, other types of requests may be sent by the agent 203 without departing from the description herein.

The request with the encrypted token is received by the security gateway instance 208 and, at 414, the security gateway instance 208 decrypts the token. In some examples, the security gateway instance 208 decrypts the token using the encryption key that is specific to the security gateway instance 208 and was used to encrypt the key at 408. Further, in some examples, the security gateway instance 208 validates the request and/or the encrypted token prior to decrypting the token as described herein. The validation may include validating the encrypted token or other identity information based on a set of allowed identity data and/or validating the request based on one or more validation handlers associated with the service resource 212.

At 416, the security gateway instance 208 sends the request with the decrypted token to the service resource 212. The decrypted token may replace the encrypted token in the request, such that the service resource 212 is only provided the decrypted token and not the encrypted token.

At 418, the service resource 212 receives the request with the decrypted token and validates the decrypted token. The service resource 212 may communicate with the token module 238 to confirm that the decrypted token is a token that was issued by the token module 238 and that it is a trusted token. In some examples, the service resource 212 may perform additional validation of the decrypted token and or other aspects of the request to complete the validation process.

At 420, the service resource 212 performs an operation or operations based on the received request. However, if the validation of the token at 418 fails, the service resource may reject or otherwise ignore the request, rather than performing an operation based thereon. The performed operation may include accessing stored data, writing new data to a data store, performing data processing or other data operations based on instructions in the request, or the like.

After performing the operation, at 422, the service resource 212 provides a response based on the request and/or the performed operation. In some examples, the provided response may include confirmation that the operation was successful, notification that the operation was unsuccessful, data that was requested in the request, or the like. The provided response 422 is sent to the security gateway instance 208. At 424, the security gateway instance 208 forwards the response to the agent 203 that originally sent the request. In some examples, the security gateway instance 208 performs operations on the response, such as removing the decrypted token and/or inserting the encrypted token, which ensures that the decrypted token which is trusted by the service resource 212 is never transmitted outside of the security boundary.

Figure 5:
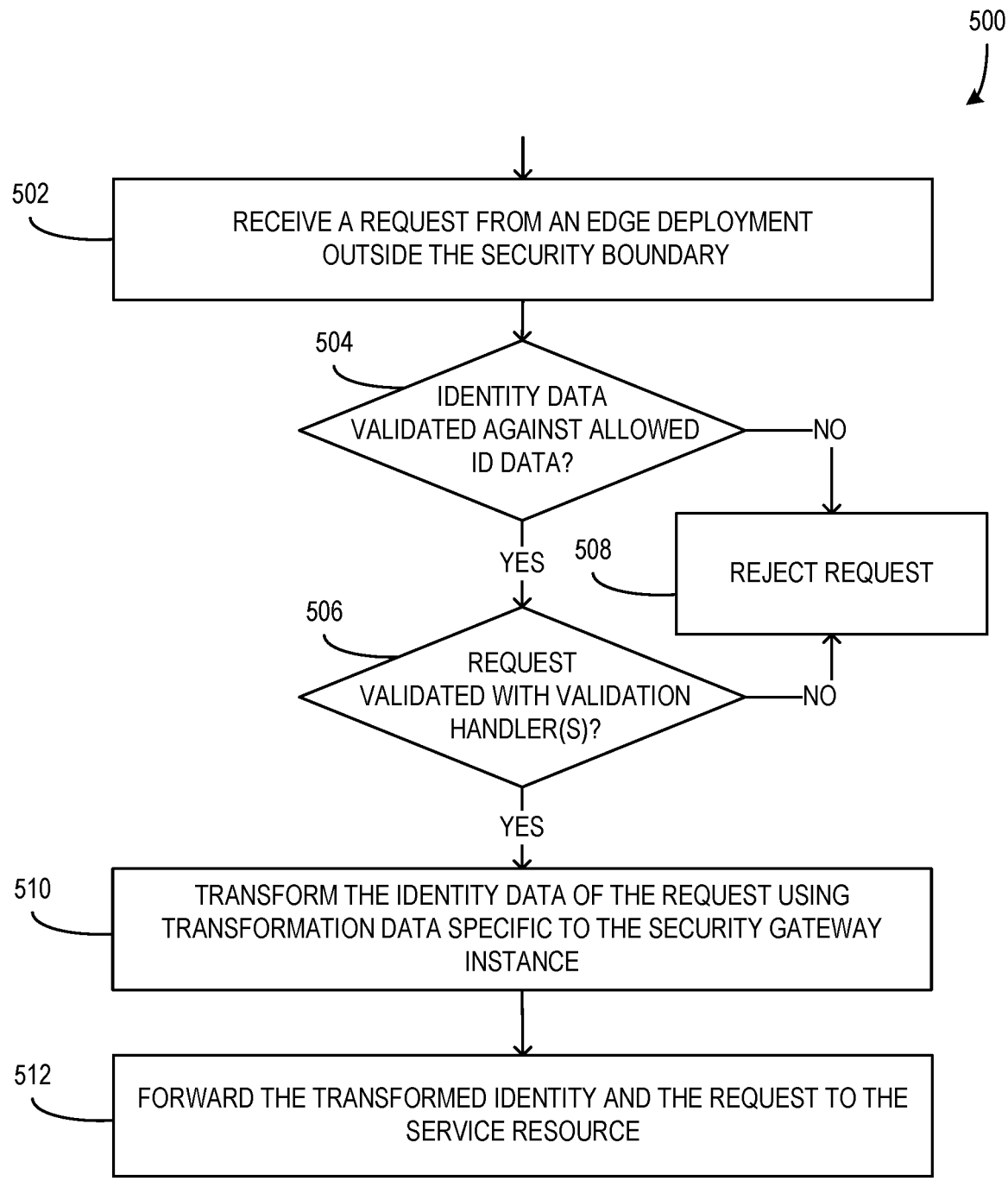
FIG. 5 is a flowchart illustrating a computerized method for handling requests to network service resources within a security boundary from agents on edge deployments by security gateway instances according to an embodiment.

FIG. 5 is a flowchart illustrating a computerized method 500 for handling requests (e.g., request 114) to network service resources (e.g., service resource 112) within a security boundary 106 from agents (e.g., agent 103) on edge deployments (e.g., edge deployment 102) by security gateway instances (e.g., security gateway instance 108) according to an embodiment. In some examples, the method 500 may be executed or otherwise performed on or by one or more components (e.g., the security gateway instance 108) of a system such as system 100 of FIG. 1. At 502, a request is received from an edge deployment outside the security boundary. In some examples, the request includes identity data (e.g., ID data 116) associated with the edge deployment and/or one or more agents within or associated with the edge deployment.

Additionally, or alternatively, the request may be received by a security gateway instance that is associated with the edge deployment by a one-to-one relationship or mapping, such that the security gateway instance is configured to only accept requests from the edge deployment and not from other edge deployments. Further, in some examples, the security gateway instance includes a front end computing instance (e.g., the front end 350) that is configured as a forward proxy that is outside the security boundary, enabling the edge deployment to send requests thereto without specifically configuring the edge deployment to interact directly with security requirements of the security boundary. In such examples, the front end of the security gateway instance may be configured to validate the identity data and the request generally and then, based on successful validation, transfer the request to a back end computing instance of the security gateway instance that is inside the security boundary, accounting for security requirements of the security boundary during the transfer of the request.

At 504, the identity data of the request is validated against allowed ID data of the security gateway instance. In some examples, the security gateway instance includes a list or other data structure that stores one or more sets of ID data that are allowed to make use of the security gateway instance. The allowed ID data may include identity data associated with the edge deployment and/or one or more agents within or otherwise associated with the edge deployment. If the identity data of the request is validated against the allowed ID data, the process proceeds to 506. Alternatively, if the identity data of the request is not validated against the allowed ID data (e.g., the identity data is not present in the allowed ID data list), the process proceeds to 508.

At 506, the request is validated with one or more validation handlers that are associated with the service resource to which the request is directed. In some examples, each service resource to which the security gateway instance provides access may be configured with validation handlers that define validation rules to be enforced by the security gateway instance prior to forwarding requests to the service resource. These validation rules may be configured to validate or not validate the request based on the identity data of the request, the content of the request, the structure of the request, or other aspects of the request without departing from the description. If the request is validated based on the validation handlers of the service resource, the process proceeds to 510. Alternatively, if the request is not validated based on the validation handlers of the service resource (e.g., the request fails to satisfy one of the validation rules of the validation handlers), the process proceeds to 508.

At 508, the request and/or associated identity data has failed validation at the security gateway instance and, as a result, the request is rejected. In some examples, the rejection of the request is communicated back to the edge deployment in the form of a rejection message or response that indicates that the associated request was rejected (e.g., the rejection message may include a reference to the request being rejected). Alternatively, rejecting the request may include ignoring the request and/or not forwarding the request to the service resource. Further, rejected requests or notifications thereof may be sent to other parts of the system, such as a component configured to monitor the system for suspicious activity or the like.

At 510, the identity data of the request is transformed using transformation data specific to the security gateway instance. The transformation of the identity data is performed in such a way that the service resource will recognize the transformed identity data as having been transformed by the specific security gateway instance, indicating that that security gateway instance has successfully validated the associated request. The transformation may include combining the identity data of the request with identity data of the security gateway instance in some manner, encrypting or decrypting the identity data based on a key specific to the security gateway instance, mapping the identity data to other data values based on a map associated with the security gateway instance, other symmetric key and/or public key-based arrangements, other methods of wrapping the identity data in data associated with the security gateway instance, or the like.

At 512, the transformed identity data and the request are forwarded to the service resource. In some examples, the transformed identity data is included in the request and replaces the identity data, such that service resource only has access to the transformed identity data and not the non-transformed identity data. This may be used to further secure the transformation process used by the security gateway instance.

In some examples, the security gateway instance further receives a response to the request from the service resource, processes the response, and/or forwards the response to the edge deployment. These operations are described in greater detail above with respect to FIG. 1.

Figure 6:
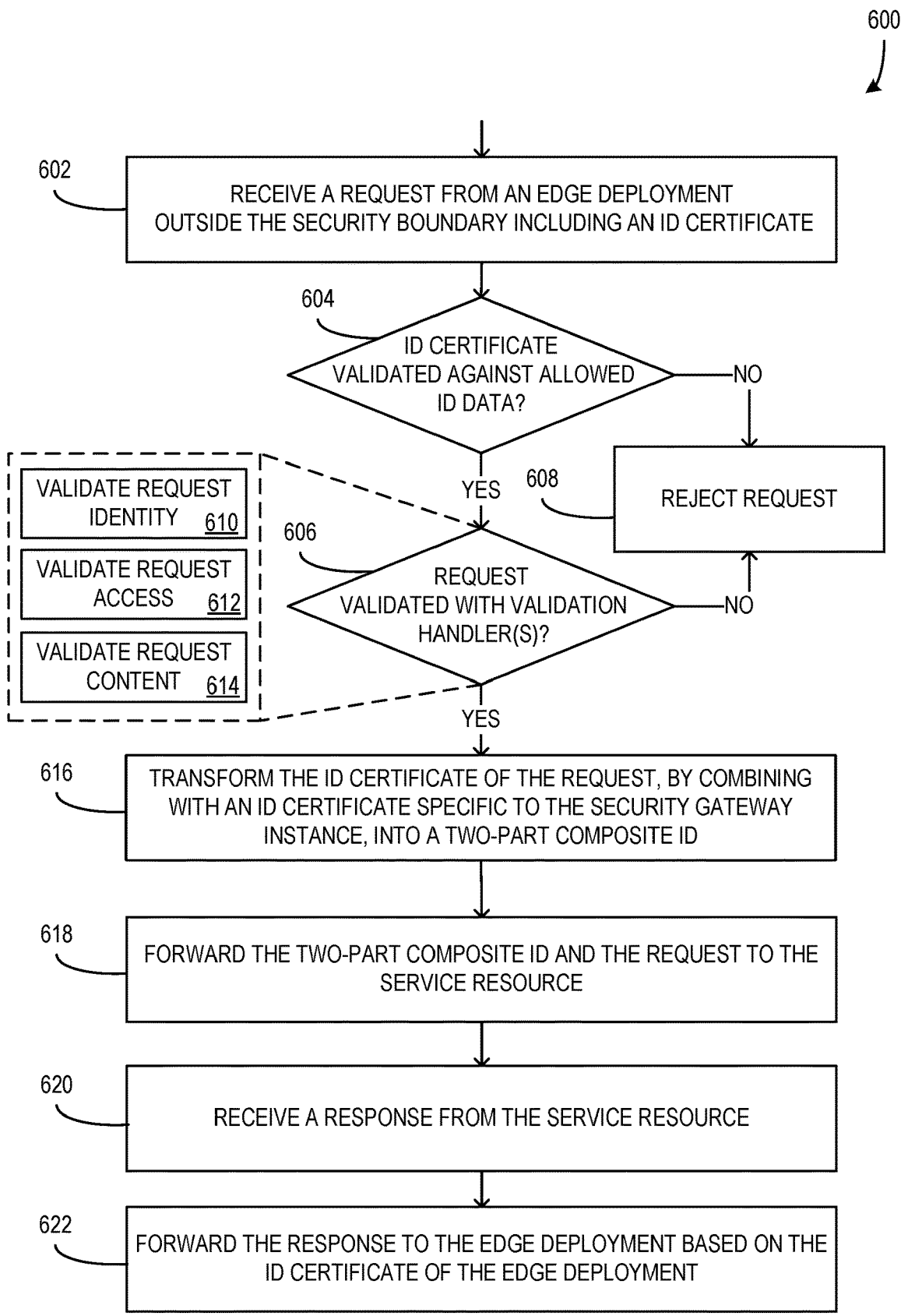
FIG. 6 is a flowchart illustrating a computerized method for handling requests to service resources that include identification certificates by a security gateway instance according to an embodiment.

FIG. 6 is a flowchart illustrating a computerized method 600 for handling requests (e.g., request 114) to service resources (e.g., service resource 112) that include ID certificates by a security gateway instance (e.g., security gateway instance 108) according to an embodiment. In some examples, the method 600 is executed or otherwise performed by one or more components of a system such as system 100 of FIG. 1. Additionally, 602-608 may be performed in substantially the same manner as 502-508 of FIG. 5 described above, wherein the identity data of the request includes an ID certificate that is used during the validation of the request at 604 and/or 606.

Further, the validation of the request with validation handlers at 606 includes at least one of validating the identity data of the request at 610, validating the access data of the request at 612, and validating the content data of the request at 614. It should be understood that the validation handlers associated with the service resource may include validation rules associated with one or more of these types of request validation. Validation of the request identity at 610 may be based on the same identity data validated by the service gateway instance at 604 and/or it may validate different data in a different manner. For instance, the service resource may define validation rules that validate the identity data of the request based on a different set of allowed ID data (e.g., the service resource may be configured to allow a smaller set of entities access than the allowed ID data of the security gateway instance, which as a broader set of allowed ID data).

The validation of access data of the request at 612 may include validating that the request is accessing only allowed or expected operations of the service resource. For instance, the service resource may limit access to certain operations or resources to specific hypertext transfer protocol (HTTP) methods or otherwise limit unique resource links (URLs) that can be used to access certain operations or resources. Such validation rules may confirm that the request adheres to such requirements and, if it does not, the request may be rejected at 608.

The validation of content of the request at 614 may include validating URLs, headers, body, or other structural elements (e.g., maximum size and/or length of the request and/or fields of the request) based on defined validation rules. Such rules may be configured to catch requests that are structured improperly, whether inadvertently or maliciously, such that the request may interrupt the successful operation of the service resource. For instance, requests that include attacks, such as overflows of fields of the request, that may cause the service resource to crash or otherwise stop operation may instead crash the service gateway instance or a particular portion of the service gateway instance (e.g., a front end computing instance behaving as a forward proxy). In examples where the service gateway instance is associated with a single edge deployment in a one-to-one relationship, the damage of such an attack may be limited to only interrupting the functionality of that edge deployment, rather than interrupting the entire service resource for all other edge deployments. Similarly, denial of service (DOS) attacks and/or distributed denial of service (DDOS) attacks may be limited to affecting the operations of a particular security gateway instance, rather than the service resource being targeted by the attacks.

In other examples, validation of a request may be based on collected telemetry data associated with the edge deployment which is compared to expected telemetry data. Other data may also be analyzed without departing from the description.

At 616, after the validation of the request, the ID certificate of the request is transformed by combining it with an ID certificate of the security gateway instance into a two-part composite ID. It should be understood that the service resource is configured to identify the portion of the two-part composite ID that is the ID certificate of the security gateway instance and, upon finding that portion of the ID, the service resource is configured to trust and process the request associated therewith.

At 618, the two-part composite ID is forwarded with the request to the service resource and, because the service resource trusts the composite ID, the service resource processes the request. As a result of the processing of the request, the service resource may generate a response to the request and send the response back to the security gateway instance.

Exemplary Operating Environment

Figure 7:
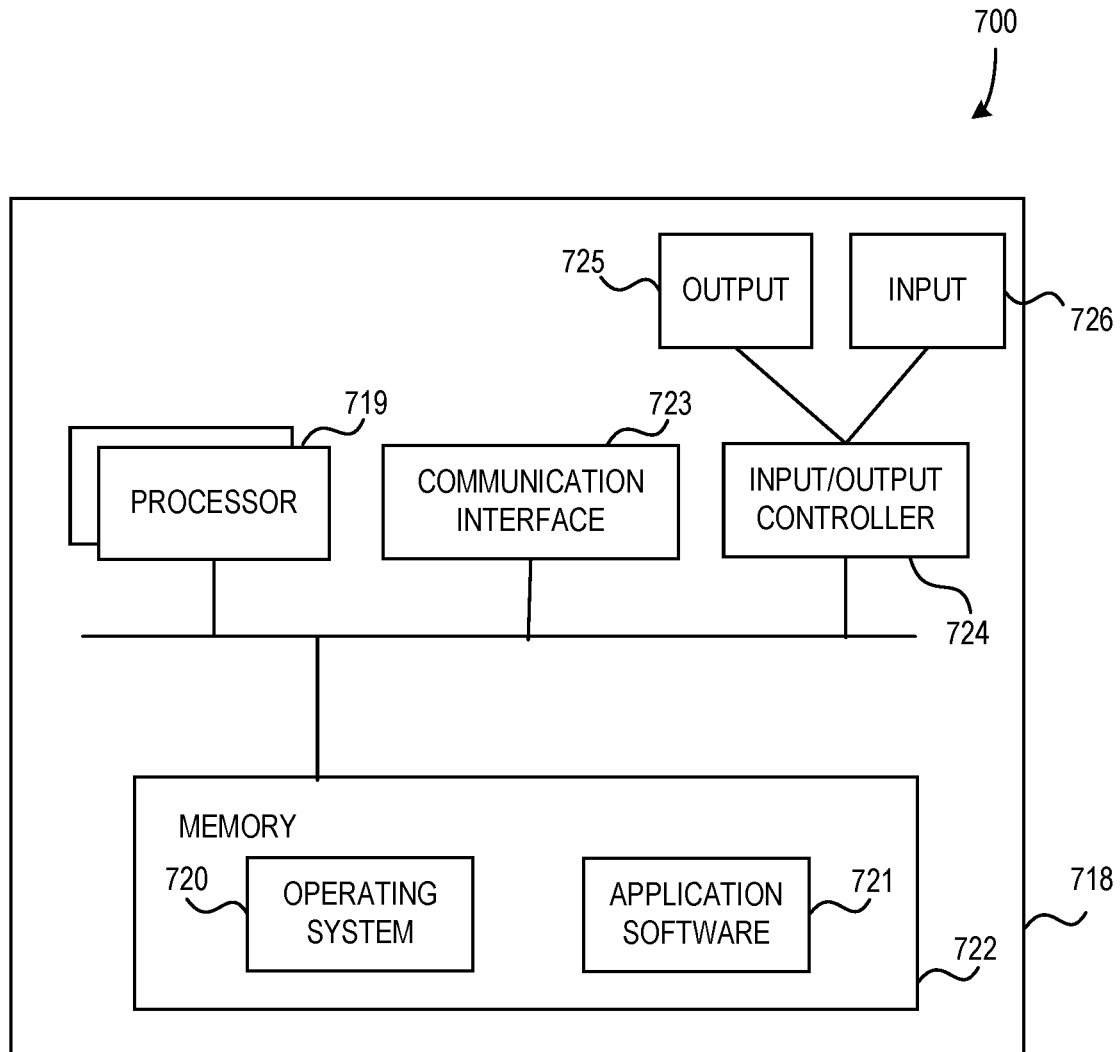
FIG. 7 illustrates a computing apparatus according to an embodiment as a functional block diagram.

The present disclosure is operable with a computing apparatus according to an embodiment as a functional block diagram 700 in FIG. 7. In an embodiment, components of a computing apparatus 718 may be implemented as a part of an electronic device according to one or more embodiments described in this specification. The computing apparatus 718 comprises one or more processors 719 which may be microprocessors, controllers, or any other suitable type of processors for processing computer executable instructions to control the operation of the electronic device. Alternatively, or in addition, the processor 719 is any technology capable of executing logic or instructions, such as a hardcoded machine. Platform software comprising an operating system 720 or any other suitable platform software may be provided on the apparatus 718 to enable application software 721 to be executed on the device. According to an embodiment, securing access to a service resource within a security boundary using a security gateway instance as described herein may be accomplished by software, hardware, and/or firmware.

Computer executable instructions may be provided using any computer-readable media that are accessible by the computing apparatus 718. Computer-readable media may include, for example, computer storage media such as a memory 722 and communications media. Computer storage media, such as a memory 722, include volatile and non-volatile, removable, and non-removable media implemented in any method or technology for storage of information such as computer readable instructions, data structures, program modules or the like. Computer storage media include, but are not limited to, RAM, ROM, EPROM, EEPROM, persistent memory, phase change memory, flash memory or other memory technology, CD-ROM, digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 722) is shown within the computing apparatus 718, it will be appreciated by a person skilled in the art, that the storage may be distributed or located remotely and accessed via a network or other communication link (e.g. using a communication interface 723).

The computing apparatus 718 may comprise an input/output controller 724 configured to output information to one or more output devices 725, for example a display or a speaker, which may be separate from or integral to the electronic device. The input/output controller 724 may also be configured to receive and process an input from one or more input devices 726, for example, a keyboard, a microphone, or a touchpad. In one embodiment, the output device 725 may also act as the input device. An example of such a device may be a touch sensitive display. The input/output controller 724 may also output data to devices other than the output device, e.g. a locally connected printing device. In some embodiments, a user may provide input to the input device(s) 726 and/or receive output from the output device(s) 725.

The functionality described herein can be performed, at least in part, by one or more hardware logic components. According to an embodiment, the computing apparatus 718 is configured by the program code when executed by the processor 719 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example system for securing access to a service resource within a security boundary comprises: at least one processor of a security gateway instance associated with the security boundary; and at least one memory comprising computer program code, the at least one memory and the computer program code configured to, with the at least one processor, cause the at least one processor to: receive a request from an edge deployment outside the security boundary, the request including identity data identifying the edge deployment, wherein the request targets the service resource within the security boundary; validate the identity data included in the request based on allowed identity data stored in association with the security gateway instance; validate the request based on a validation handler associated with the service resource at which the request is targeted; based on validating the identity data and validating the request, transform the identity data using security data specific to the security gateway instance, wherein the transformed identity data indicates that the request has been validated by the security gateway instance, wherein transforming the identity data includes at least one of the following: appending at least one data value associated with the security data to the identity data, translating at least one data value of the identity data based on a translation process of the security data, and mapping at least one data value of the identity data to a different data value based on the security data; and based on transforming the identity data of the request, forward the transformed identity data and the request to the service resource via a network link within the security boundary, wherein the service resource is configured to process the request based on identifying the transformed identity data.

An example computerized method for securing access to a service resource within a security boundary comprises: receiving, by a processor of a security gateway instance associated with the security boundary, a request from an edge deployment outside the security boundary, the request including identity data identifying the edge deployment, wherein the request targets the service resource within the security boundary; validating, by the processor, the identity data included in the request based on allowed identity data stored in association with the security gateway instance; validating, by the processor, the request based on a validation handler associated with the service resource at which the request is targeted; based on validating the identity data and validating the request, transforming, by the processor, the identity data using security data specific to the security gateway instance, wherein the transformed identity data indicates that the request has been validated by the security gateway instance, wherein transforming the identity data includes at least one of the following: appending at least one data value associated with the security data to the identity data, translating at least one data value of the identity data based on a translation process of the security data, and mapping at least one data value of the identity data to a different data value based on the security data; and based on transforming the identity data of the request, forwarding, by the processor, the transformed identity data and the request to the service resource via a network link within the security boundary, wherein the service resource is configured to process the request based on identifying the transformed identity data.

One or more computer storage media have computer-executable instructions for securing access to a service resource within a security boundary that, upon execution by a processor, cause the processor to at least: receive, by a security gateway instance, a request from an edge deployment outside the security boundary, the request including identity data identifying the edge deployment, wherein the request targets the service resource within the security boundary; validate the identity data included in the request based on allowed identity data stored in association with the security gateway instance; validate the request based on a validation handler associated with the service resource at which the request is targeted; based on validating the identity data and validating the request, transform the identity data using security data specific to the security gateway instance, wherein the transformed identity data indicates that the request has been validated by the security gateway instance, wherein transforming the identity data includes at least one of the following: appending at least one data value associated with the security data to the identity data, translating at least one data value of the identity data based on a translation process of the security data, and mapping at least one data value of the identity data to a different data value based on the security data; and based on transforming the identity data of the request, forward the transformed identity data and the request to the service resource via a network link within the security boundary, wherein the service resource is configured to process the request based on identifying the transformed identity data.

Alternatively, or in addition to the other examples described herein, examples include any combination of the following:

- further comprising: receiving, by the processor, a response to the request from the service resource via the network link; reversing, by the processor, the transformation of the transformed identity data based on the security data, wherein reversing the transformation on the transformed identity data yields the identity data included in the received request; and forwarding, by the processor, the response to the edge deployment outside of the security boundary, wherein the response includes the identity data included in the received request.
- wherein the identity data includes an ID certificate of the edge deployment and the security data includes an ID certificate of the security gateway instance; wherein transforming the identity data based on the security data includes combining the ID certificate of the edge deployment and the ID certificate of the security gateway instance into a two-part composite ID; wherein the two-part composite ID is forwarded to the service resource as the transformed identity data with the request; and wherein the service resource is configured to validate the two-part composite ID based on the ID certificate of the security gateway instance being included therein.
- wherein the identity data includes an encrypted token, and the security data includes an encryption key specific to the security gateway instance; wherein transforming the identity data based on the security data includes decrypting the encrypted token into a decrypted token based on the encryption key; wherein the decrypted token is forwarded to the service resource as the transformed identity data with the request; and wherein the service resource is configured to validate the decrypted token.
- further comprising: receiving, by the processor, a token request from the edge deployment; forwarding, by the processor, the token request to the service resource; based forwarding the token request to the service resource, receiving, by the processor, a token response from the service resource including a token associated with the service resource; encrypting, by the processor, the token of the token response using the encryption key specific to the security gateway instance; sending, by the processor, an encrypted token response to the edge deployment, including the encrypted token; and wherein the received request from the edge deployment includes the encrypted token sent in the encrypted token response.
- wherein the security gateway instance is configured to have a one-to-one mapping with the edge deployment, wherein the security gateway instance is configured to only process requests from the mapped edge deployment.

wherein the security gateway instance includes a front end computing instance that is outside the security boundary and a back end computing instance that is inside the security boundary; wherein the security gateway instance enforces security rules associated with the security boundary on communications between the front end computing instance and the back end computing instance; wherein receiving the request, validating the identity data, and validating the request are performed in the front end computing instance; and wherein transforming the identity data and forwarding the request with the transformed identity data to the service resource are performed in the back end computing instance.

wherein the security gateway instance includes a front end computing instance that is in a first security context and a back end computing instance that is in a second security context; wherein the security gateway instance enforces security rules associated with the first security context and the second security context on communications between the front end computing instance and the back end computing instance; wherein receiving the request, validating the identity data, and validating the request are performed in the front end computing instance; and wherein transforming the identity data and forwarding the request with the transformed identity data to the service resource are performed in the back end computing instance.

Any range or device value given herein may be extended or altered without losing the effect sought, as will be apparent to the skilled person.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute an exemplary means for receiving, by a processor of a security gateway instance associated with the security boundary, a request from an edge deployment outside the security boundary, the request including identity data identifying the edge deployment, wherein the request targets the service resource within the security boundary; exemplary means for validating, by the processor, the identity data included in the request based on allowed identity data stored in association with the security gateway instance; exemplary means for validating, by the processor, the request based on a validation handler associated with the service resource at which the request is targeted; based on validating the identity data and validating the request, exemplary means for transforming, by the processor, the identity data using security data specific to the security gateway instance, wherein the transformed identity data indicates that the request has been validated by the security gateway instance, wherein transforming the identity data includes at least one of the following: appending at least one data value associated with the security data to the identity data, translating at least one data value of the identity data based on a translation process of the security data, and mapping at least one data value of the identity data to a different data value based on the security data; and based on transforming the identity data of the request, exemplary means for forwarding, by the processor, the transformed identity data and the request to the service resource via a network link within the security boundary, wherein the service resource is configured to process the request based on identifying the transformed identity data.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for securing access to a first service resource configured within a security boundary of a cloud computing system, the system comprising:
   a processor of a security gateway instance configured within the security boundary; and memory of the security gateway instance comprising computer program code that, when executed by the processor, cause the processor to:
receive, from an edge deployment configured outside the security boundary, a request including identity data identifying the edge deployment, wherein:
the request targets the first service resource configured within the security boundary; and
the identity data is useable to access a second service resource configured outside the security boundary of the cloud computing system;
validate the request;
based on validating the request, transform the identity data into trusted identity data by at least one of appending a data value associated with the security gateway instance to the identity data, translating a data value of the identity data based on a translation process associated with the security gateway instance, or mapping a data value of the identity data to a different data value based on the security gateway instance; and
forward the trusted identity data and the request to the first service resource via a network link within the security boundary.

2. The system of claim 1, the computer program code further causes the processor to:
receive a response to the request from the first service resource via the network link;
reverse the transformation of the trusted identity data to yield the identity data included in the request; and
forward the response to the edge deployment configured outside of the security boundary, wherein the forwarded response includes the identity data included in the request.

3. The system of claim 1, wherein:
the identity data includes an identification (ID) certificate of the edge deployment;
the data value is associated with an ID certificate of the security gateway instance;
transforming the identity data includes combining the ID certificate of the edge deployment and the ID certificate of the security gateway instance into a two-part composite ID;
the two-part composite ID is forwarded to the first service resource as the transformed trusted identity data with the request; and
the first service resource is configured to validate the two-part composite ID based on the ID certificate of the security gateway instance being included therein.

4. The system of claim 1, wherein:
the identity data includes an encrypted token;
the data value is associated with an encryption key specific to the security gateway instance;
transforming the identity data includes decrypting the encrypted token into a decrypted token based on the encryption key;
the decrypted token is forwarded to the first service resource as the trusted identity data with the request; and
the first service resource is configured to validate the decrypted token.

5. The system of claim 4, wherein the computer program code further causes the processor to:
receive a token request from the edge deployment;
forward the token request to the first service resource;
based on forwarding the token request to the first service resource, receive a token response from the first service resource including a token associated with the first service resource;
encrypt the token of the token response using the encryption key specific to the security gateway instance;
send an encrypted token response to the edge deployment, including the encrypted token, wherein the request received from the edge deployment includes the encrypted token sent in the encrypted token response.

6. The system of claim 1, wherein the security gateway instance has a one-to-one mapping with the edge deployment such that the security gateway instance is configured to only process requests from the edge deployment.

7. The system of claim 1, wherein:
the security gateway instance includes a front end computing instance that is outside the security boundary and a back end computing instance that is inside the security boundary;
the security gateway instance enforces security rules associated with the security boundary on communications between the front end computing instance and the back end computing instance;
receiving the request and validating the request are performed in the front end computing instance; and
transforming the identity data and forwarding the request with the trusted identity data to the first service resource are performed in the back end computing instance.

8. A computerized method for securing access to a first service resource configured within a security boundary of a cloud computing system, the computerized method comprising:
receiving, by a processor of a security gateway instance configured within the security boundary, a request from an edge deployment configured outside the security boundary, the request including identity data identifying the edge deployment, wherein:
the request targets the first service resource configured within the security boundary;
the identity data is useable to access a second service resource configured outside the security boundary of the cloud computing system; and
the security gateway instance has a one-to-one mapping with the edge deployment such that the security gateway instance is configured to only process requests from the edge deployment;
validating, by the processor, the request;
based on validating the request, transforming, by the processor, the identity data into trusted identity data by at least one of appending a data value associated with the security gateway instance to the identity data, translating a data value of the identity data based on a translation process associated with the security gateway instance, or mapping a data value of the identity data to a different data value based on the security gateway instance; and
forwarding, by the processor, the trusted identity data and the request to the first service resource via a network link within the security boundary.

9. The computerized method of claim 8, further comprising:
receiving, by the processor, a response to the request from the first service resource via the network link;
reversing, by the processor, the transformation of the trusted identity data to yield the identity data included in the request; and forwarding, by the processor, the response to the edge deployment configured outside of the security boundary, wherein the response includes the identity data included in the request.

10. The computerized method of claim 8, wherein:

the identity data includes an identification (ID) certificate of the edge deployment;

the data value is associated with an ID certificate of the security gateway instance;

transforming the identity data includes combining the ID certificate of the edge deployment and the ID certificate of the security gateway instance into a two-part composite ID;

the two-part composite ID is forwarded to the first service resource as the trusted identity data with the request; and wherein the first service resource is configured to validate the two-part composite ID based on the ID certificate of the security gateway instance being included therein.

11. The computerized method of claim 8, wherein:

the identity data includes an encrypted token;

the data value is associated with an encryption key specific to the security gateway instance;

transforming the identity data includes decrypting the encrypted token into a decrypted token based on the encryption key;

the decrypted token is forwarded to the first service resource as the trusted identity data with the request; and the first service resource is configured to validate the decrypted token.

12. The computerized method of claim 11, further comprising:

receiving, by the processor, a token request from the edge deployment;

forwarding, by the processor, the token request to the first service resource;

based on forwarding the token request to the first service resource, receiving, by the processor, a token response from the first service resource including a token associated with the first service resource;

encrypting, by the processor, the token of the token response using the encryption key specific to the security gateway instance;

sending, by the processor, an encrypted token response to the edge deployment, including the encrypted token, wherein the request received from the edge deployment includes the encrypted token sent in the encrypted token response.

13. The computerized method of claim 8, wherein:

the security gateway instance includes a front end computing instance that is configured outside the security boundary and a back end computing instance that is configured inside the security boundary;

the security gateway instance enforces security rules associated with the security boundary on communications between the front end computing instance and the back end computing instance;

receiving the request and validating the request are performed in the front end computing instance; and transforming the identity data and forwarding the request with the trusted identity data to the first service resource are performed in the back end computing instance.

14. A system for securing access to a service resource configured within a security boundary of a cloud computing system, comprising:

a processor; and memory storing computer program code that, upon execution by the processor, cause the processor to:

receive, by a security gateway instance configured within the security boundary, a request from an edge deployment configured outside the security boundary, the request including an identification (ID) certificate of the edge deployment, wherein the request targets the service resource configured within the security boundary;

transform the ID certificate into a two-part composite ID by combining the ID certificate of the edge deployment and an ID certificate of the security gateway instance; and forward the two-part composite ID and the request to the service resource via a network link within the security boundary, wherein the service resource is configured to process the request based on validating the two-part composite ID.

15. The system of claim 14, wherein the security gateway instance has a one-to-one mapping with the edge deployment, wherein the security gateway instance is configured to only process requests from the edge deployment.

16. The system of claim 14, wherein:

the security gateway instance includes a front end computing instance that is configured outside the security boundary and a back end computing instance that is configured inside the security boundary;

the security gateway instance enforces security rules associated with the security boundary on communications between the front end computing instance and the back end computing instance;

receiving the request, is performed in the front end computing instance; and transforming the ID certificate of the edge deployment and forwarding the request with the two-part composite ID to the service resource are performed in the back end computing instance.

* * * * *